Patented Dec. 18, 1934

1,984,739

UNITED STATES PATENT OFFICE 1,984,739

AZO DYE AND METHOD OF MAKING SAME

Ernest F. Grether and Lindley E. Mills, Midland, Mich., assignors to The Dow Chemical Company, Midland, Mich., a corporation of Michigan No Drawing. Application April 15, 1931,
Serial No. 530,426

6 Claims. (Cl. 260—95)

This invention relates to direct developed azo dyestuffs of the type wherein an arylide of 2,3-hydroxy-naphthoic acid is coupled with a diazotized arylamine, and has regard particularly to a new sub-class of the above general character, but distinguished from those hitherto known in that the aforesaid arylide component thereof is formed by condensing aromatic amines having probably the general formula

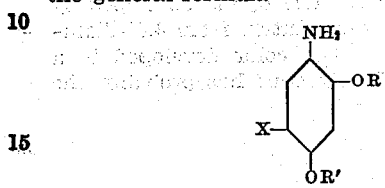

wherein X represents a halogen group, and wherein R and R' represents alkyl, aryl, and/or aralkyl groups, with 2,3-hydroxy-naphthoic acid. The azo dyes hereinafter fully described and claimed have probably the general formula

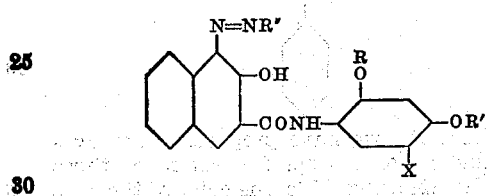

wherein X represents a halogen group, R and R' represent alkyl, aryl and/or aralkyl residues, and R'' represents an aryl residue of the benzene or naphthalene series which may be further substituted by groups such as the alkyl, aryl, aralkyl, alkoxy, aryloxy, aralkoxy, benzoyl-amino, halogen, azo and/or nitro groups.

It is well known that direct azo dyes fast to light and washing are produced by coupling arylides of 2,3-hydroxy-naphthoic acid with diazotized or tetrazotized arylamines, as is evidenced by the large number of issued patents bearing on the subject. We have discovered, however, that when the di-alkoxy-halo-anilides or di-aryloxy-halo-anilides of 2,3-hydroxy-naphthoic acid are so coupled, the dyestuffs produced are fast toward light and washing and the colors produced are deep and clear in tone. The invention, then, consists of azo dyestuffs derived from di-alkoxy-halo-anilides and di-aryloxy-halo-anilides of 2,3-hydroxy-naphthoic acid, together with methods for the preparation thereof, as hereinafter fully described and particularly pointed out in the claims, the following description setting forth certain procedure representative of various ways in which the principle of the invention may be practiced.

The herein described dyestuffs dye cotton and other fibers directly in a wide range of colors varying from red to blue and black and in clear and brilliant tones. They are best prepared by developing on the fiber, but may also be produced in substance per se or deposited upon suitable substrata to form lakes, in which forms they are useful pigments because of their insolubility, stability and fastness.

Substituted anilines, from which the arylides hereinafter utilized were made, were themselves prepared in the following way:—

Ortho-dichlorobenzene was chlorinated to obtain trichlorbenzene and the latter nitrated, either with concentrated nitric acid or with a mixture of nitric and sulfuric acids, to the corresponding trichlor-mono-nitro-benzene of M. P. 57° C., and having probably the formula

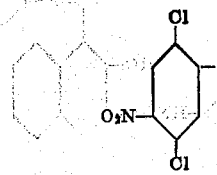

Chloro-dimethoxy-nitro-benzene having probably the formula

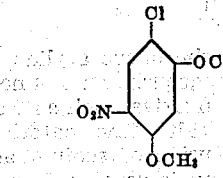

was formed by treating a boiling methyl alcohol solution of the above mentioned trichlor-nitro-benzene with slightly more than two molecular equivalents of sodium or potassium hydroxide dissolved in methyl alcohol. The mixture was diluted with a large excess of water, filtered, and the residue recrystallized from methanol, M. P. 130° C.

Chloro-diethoxy-nitro-benzene of M. P. 120.5° C. was prepared in the same manner as was chloro-methoxy-nitro-benzene, except that ethyl alcohol was used in place of methyl alcohol.

Chloro-diphenoxy-nitrobenzene of M. P. 73.5° C. was prepared by treating a mixture of potassium or sodium phenolate with trichloro-nitro-benzene at approximately 220° C. for 4 hours. The product was distilled and the fraction distilling at 210°–215° C. at 4 mm. collected.

The chloro-dialkoxy-nitro-benzenes and chloro-diphenoxy-nitro-benzene were reduced with iron and acetic acid to the corresponding substituted anilines according to the known method.

A preferred manner in which dyes comprising the invention may be prepared is illustrated in the specific examples given below, it being understood, however, that such examples are not to be construed as a limitation upon the invention.

Example 1

The di-ethoxy-chlor-anilide of 2,3-hydroxy-naphthoic acid is prepared by heating equimolecular quantities of di-ethoxy-chlor-aniline and 2,3-hydroxy-naphthoic acid in the presence of approximately 15 per cent of their combined weight (slightly more than ⅓ of a molecular equivalent) of phosphorous trichloride under reflux and in a medium of toluene for 3 to 5 hours. Excess sodium carbonate is then added and the toluene removed by distilling with steam. The aqueous residue containing the arylide product in suspension therein is filtered, and the precipitate washed with water. The product is then purified by dissolving in dilute, 1 to 2 per cent, caustic alkali solution, preferably in the presence of alcohol, filtering from unreacted di-ethoxy-chlor-aniline, and precipitating by acidification of the alkaline solution. The intermediate compound so produced has probably the formula

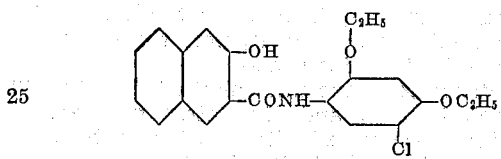

Cotton material is impregnated with a slightly alkaline solution of the above arylide to which may be added advantageously, but not necessarily, formaldehyde and a fixative, such as Turkey red oil or an aluminum salt. The material is then dipped in a cold solution of sodium acetate or carbonate, and the dye is developed by adding a diazo solution derived from 4-methoxy-3-chlor-aniline. The color developed is a clear, dark cardinal. The dyestuff has probably the formula

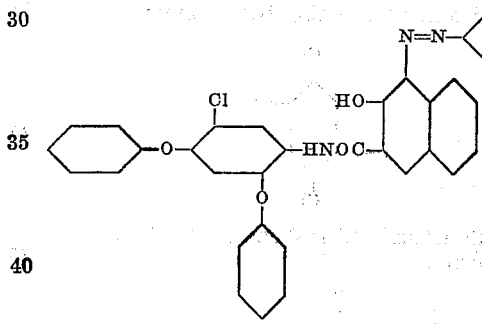

Example 2

By procedure similar to that described in Example 1, the di-methoxy-chlor-anilide of 2,3-hydroxy-naphthoic acid was prepared by condensing di-methoxy-chlor-aniline with 2,3-hydroxy-naphthoic acid. The dye is developed by treatment with a diazo solution from ortho-amino-diphenyl ether. The color is a castilian red. The dyestuff has probably the formula

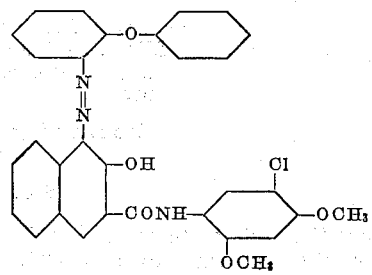

Example 3

The di-phenoxy-chlor-anilide of 2,3-hydroxy-naphthoic acid is prepared in the manner described in Example 1. The dye is developed by treatment with a diazo solution from 4,4'-diamino-diphenyl ether. The color developed is a strawberry red. The dyestuff has probably the formula

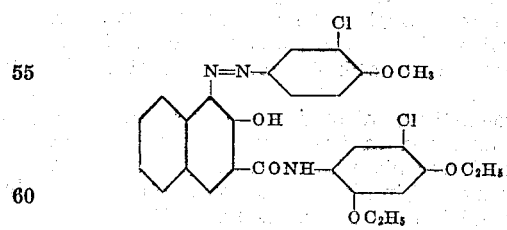

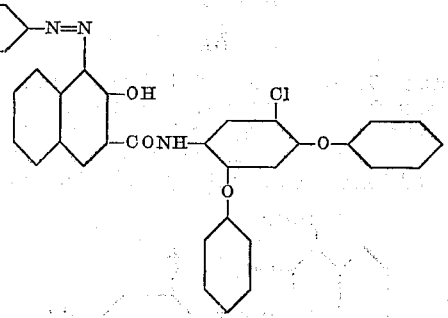

In like manner, we have prepared other dyes of the same general type, for example, those shown in the following table, the color of the dyes being designated according to the "Standard Color Card of America", (1928 ed.), issued by "The Textile Card Association of the United States, Inc."

While in the detailed Example 1 cotton fiber has been specifically referred to as the material to be dyed with the herein described new dyestuffs, other natural or synthetic fibers may likewise be dyed therewith, such as silk, rayon or the like. It is immaterial as regards the novelty of our invention whether the dye is applied by developing on the fiber or prepared in substance for use as a pigment. Mordanting or other auxiliary treatments for promoting the absorption of the dye by the fiber, or after treatment with metallic salts, e. g. chromium, copper or aluminum salts, for fixing the dye or modifying its color tone may be optionally employed without departing from the spirit of our invention, which is intended to include not only the dyestuffs of the general type herein described, but also material dyed therewith.

| Arylide component | Diazo component | Color |
|---|---|---|
| 2,3-hydroxy-naphthoic acid condensed with: | | |
| Chloro-dimethoxy-aniline | m-nitraniline | Pimento. |
| Do | 2-chlor-4-nitraniline | Goya. |
| Do | o-amino-diphenyl ether | Castilian red. |
| Do | 3,4-dichloro-aniline | Pimento. |
| Do | 4-phenoxy-alpha-naphthyl-amine | Mulberry fruit. |

| Arylide component | Diazo component | Color | |
|---|---|---|---|
| 2,3-hydroxy-naphthoic acid condensed with: | | | |
| Chloro-dimethoxy-aniline | Dianisidine | Homage blue. | |
| Do | 4,4'-diamino-diphenyl ether | Cardinal. | |
| Do | Alpha-naphthylamine | Claret. | |
| Chloro-diethoxy-aniline | m-(benzoyl-amino-) aniline | Castilian red. | |
| Do | m-nitraniline | Lacquer. | |
| Do | Trichloraniline | Do. | |
| Do | 2-chloro-4-amino-diphenyl ether | Goya. | |
| Do | p-nitro-o-toluidine | Lacquer. | |
| Do | 3,4-dichloro-aniline | Do. | |
| Do | o-amino-diphenyl ether | Scarlet. | |
| Do | 2-amino-4,5-dichloro-2'-phenyl-diphenyl ether | Cardinal. | |
| Do | 2-amino-4,5-dichloro-diphenyl ether | Goya. | |
| Do | 2-methoxy-3-chloro-5-amino-diphenyl | Do. | |
| Do | o-chloro-p-nitraniline | Lacquer. | |
| Do | 2,2'-diamino-4,4'-dibromo-diphenyl ether | Goya. | |
| Do | 2-nitro-4-methyl-aniline | Do. | |
| Do | 3-chloro-4-methoxy-aniline | Dark cardinal. | |
| Do | 4,4'-diamino-diphenyl ether | Do. | |
| Do | 2-methoxy-3,5-diamino-diphenyl | Garnet. | |
| Do | 4-(benzoyl-amino) aniline | Do. | |
| Do | 2,4-diethoxy-5-chloro-aniline | Reddish garnet. | |
| Do | 4-amino-azo-benzene | Garnet. | |
| Do | Alpha-naphthylamine | Reddish claret. | |
| Do | 2-methoxy-5-amino-diphenyl | Maroon. | |
| Do | 1-amino-5,8-dichloro-naphthalene | Raspberry. | |
| Do | 2,7-diamino-3,6-dibromo-carbazole | Light mulberry. | |
| Do | 1-amino-4-(benzoyl-amino) naphthalene | Reddish plum. | |
| Do | Amino-naphthyl-phenyl ether | Do. | |
| Do | Amino-1,2'-dinaphthyl ether | Mulberry fruit. | |
| Do | 2,2'-dimethoxy-3,3'-diamino-1,1'-dinaphthyl | Do. | |
| Do | 1,5-diamino-naphthalene | Egg plant. | |
| Do | 1-amino-4-naphthalene-azo-3'-chloro-4'-methoxy-benzene | Bluish black. | |
| Do | Benzene-azo-4-naphthyl-amine | Do. | |
| Do | 1-nitro-4-ethoxy-aniline | Do. | |
| Chloro-diphenoxy aniline | m-nitraniline | Coral blush. | |
| Do | 2-chloro-4-nitraniline | Fiesta. | |
| Do | o-amino-diphenyl ether | Do. | |
| Do | 3,4-dichloro-aniline | Crab apple. | |
| Do | Amino-naphthyl-phenyl ether | Mignon. | |
| Do | Dianisidine | Taupe. | |
| Do | 4,4'-diamino-diphenyl ether | Strawberry. | |
| Do | Alpha-naphthylamine | Raspberry. | |

In the following claims it is understood that the invention comprehends the coupling of the herein described arylides of 2,3-hydroxy-naphthoic acid with any diazotized aromatic mono-, di-, or poly-amino compound, as well as the azo-dye-stuffs derived therefrom.

Other modes of applying the principle of our invention may be employed instead of the one explained, change being made as regards the materials employed, provided the ingredients stated by any of the following claims or the equivalent of such ingredients be employed.

We therefore particularly point out and distinctly claim as our invention:—

1. The method of making an azo dye which comprises coupling an arylide of 2,3-hydroxy-naphthoic acid, having the formula

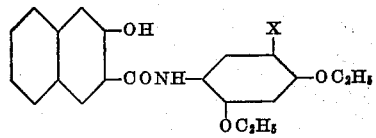

wherein X represents a halogen group, with a diazotized aromatic amino compound.

2. The method of making azo dyestuffs which comprises coupling an arylide of 2,3-hydroxy-naphthoic acid having the formula

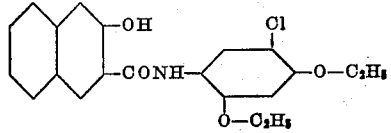

with a diazotized aromatic amino compound.

3. An azo dyestuff having the formula

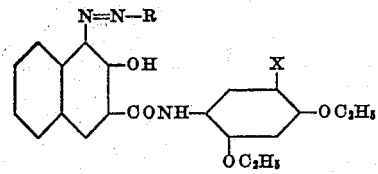

wherein X represents a halogen group and R represents an aromatic radical from a diazotized aromatic amino compound.

4. An azo dyestuff having the formula

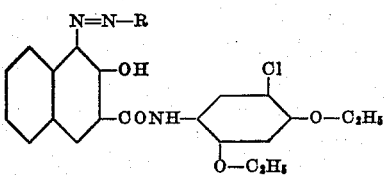

wherein R represents an aromatic radical from a diazotized aromatic amino compound.

5. Fiber dyed with a dyestuff as claimed in claim 3.

6. Fiber dyed with a dyestuff as claimed in claim 4.

ERNEST F. GRETHER.
LINDLEY E. MILLS.